(12) United States Patent
Schutt (10) Patent No.: US 11,306,793 B2
(45) Date of Patent: Apr. 19, 2022

(54) TORQUE ADJUSTMENT MECHANISM

(71) Applicant: The McAlear Group, Inc., Maumee, OH (US)

(72) Inventor: Gerald Schutt, Whitehouse, OH (US)

(73) Assignee: The McAlear Group, Inc., Maumee, OH (US)

( * ) Notice: Subject to any disclaimer, the term of this patent is extended or adjusted under 35 U.S.C. 154(b) by 0 days.

(21) Appl. No.: 17/066,817

(22) Filed: Oct. 9, 2020

(65) Prior Publication Data

US 2021/0108693 A1 Apr. 15, 2021

Related U.S. Application Data

(60) Provisional application No. 62/913,892, filed on Oct. 11, 2019.

(51) Int. Cl.
| | |
|---|---|
| *F16F 1/12* | (2006.01) |
| *F16F 1/06* | (2006.01) |
| *E05D 13/00* | (2006.01) |
| *F03G 1/02* | (2006.01) |
| *F03G 1/08* | (2006.01) |

(52) U.S. Cl.
CPC ............... *F16F 1/121* (2013.01); *F16F 1/06* (2013.01); *E05D 13/1261* (2013.01); *E05Y 2201/484* (2013.01); *E05Y 2201/492* (2013.01); *E05Y 2900/106* (2013.01); *F03G 1/02* (2013.01); *F03G 1/08* (2013.01); *F16F 2226/02* (2013.01); *F16F 2228/08* (2013.01); *F16F 2230/0005* (2013.01); *F16F 2234/02* (2013.01); *F16F 2236/085* (2013.01); *F16F 2238/024* (2013.01)

(58) Field of Classification Search
CPC .... F16F 1/041; F16F 1/06; F16F 1/121; F16F 2226/02; F16F 2228/08; F16F 2230/0005; F16F 2234/02; F16F 2236/085; F16F 2238/024; E05D 13/1261; E05Y 2201/484; E05Y 2201/492; E05Y 2900/106
See application file for complete search history.

(56) References Cited

U.S. PATENT DOCUMENTS

| | | | |
|---|---|---|---|
| 5,464,197 A | 11/1995 | Ecclesfield | |
| 5,722,645 A * | 3/1998 | Reitter | B60G 11/16 267/177 |

(Continued)

FOREIGN PATENT DOCUMENTS

| | | | | |
|---|---|---|---|---|
| JP | 2006-590050 | * | 8/2006 | ............... F16F 1/12 |
| JP | 2013-011295 | * | 1/2013 | ............... F16F 1/12 |

*Primary Examiner* — Thomas W Irvin
(74) *Attorney, Agent, or Firm* — Schaffer, Schaub & Marriott, Ltd.

(57) ABSTRACT

A torque adjustment mechanism is provided for use with a torsion spring. The torsion spring is a coil spring having a plurality of helical coils that define a hollow core. A torque adjuster is positioned in the interior of the hollow core of the coil spring. The torque adjuster has a circular collar on one end and a securing flange on the other end. The circular collar is designed to fit into the hollow core of the coil spring. A clamp is positioned over the exterior of the coil spring in alignment with the circular collar. The clamp secures the coil spring to circular. The position of the collar in the spring defines the number of the coils that are active and establishes the level torque provided by the torsion spring.

13 Claims, 6 Drawing Sheets

(56) References Cited

U.S. PATENT DOCUMENTS

| | | | | |
|---|---|---|---|---|
| 6,471,197 | B1* | 10/2002 | Denk | F16F 1/041 |
| | | | | 267/175 |
| 6,811,149 | B1* | 11/2004 | Johnson | F16F 1/06 |
| | | | | 267/167 |
| 6,843,759 | B2 | 1/2005 | Wallerstein | |
| 6,902,045 | B2* | 6/2005 | Oliver | B60G 15/063 |
| | | | | 188/321.11 |
| 9,140,325 | B2* | 9/2015 | Cox | B60G 11/14 |
| 9,273,504 | B2 | 3/2016 | Schutt | |
| 9,534,434 | B2 | 1/2017 | Schutt | |
| 10,315,287 | B2* | 6/2019 | Moriyama | F16F 1/04 |
| 10,583,706 | B2* | 3/2020 | Tange | C21D 7/06 |
| 10,604,207 | B2* | 3/2020 | Winefordner | B60G 11/16 |
| 10,611,428 | B2* | 4/2020 | Winefordner | F16F 1/13 |
| 2005/0258582 | A1* | 11/2005 | Chou | F16F 1/041 |
| | | | | 267/177 |
| 2013/0175394 | A1* | 7/2013 | Cipra | F16F 1/13 |
| | | | | 244/129.1 |
| 2014/0027072 | A1* | 1/2014 | Schutt | E05D 15/24 |
| | | | | 160/191 |
| 2015/0343871 | A1* | 12/2015 | Tange | B60G 11/14 |
| | | | | 267/286 |
| 2017/0157744 | A1* | 6/2017 | Moriyama | B24C 1/10 |
| 2020/0400206 | A1* | 12/2020 | Zohar | F16F 1/128 |
| 2022/0025699 | A1* | 1/2022 | Barioli | E06B 9/15 |

\* cited by examiner

TORQUE ADJUSTMENT MECHANISM

CROSS REFERENCE TO RELATED APPLICATION

This application claims the benefit of U.S. provisional patent application Ser. No. 62/913,892, filed Oct. 11, 2019.

BACKGROUND OF THE INVENTION

The invention is directed to a torque adjustment mechanism for a torsion spring. The torque adjustment mechanism is frequently used in garage door applications, although it should be understood that the invention can be used in other applications.

In the garage door industry torsion springs are used to counterbalance the weight of garage or so that the garage door can be relatively easily opened and closed. The garage doors very in size and weight and this requires specific torsion springs, having specific performance parameters to be manufactured and installed to correctly counterbalance new and existing garage doors. To ensure that the proper torsion springs are available, door manufacturers and dealers need to specify and stock a wide variety torsion springs, spring snakes and temporary repair parts to have the appropriate torsion springs for the installation of new doors and to repair existing doors with failed springs. Frequently, the correct torsion spring is not available, and this leads to delays in installing the torsion spring. In addition, an inappropriately sized torsion spring is often used because that is the size of the torsion spring that is available. This can result in an unsatisfactory performance and lifespan for the torsion spring. Being forced to carry a wide range of spring sizes also significantly increases the inventory costs for spring manufacturers and garage door installers. The current invention solves these difficulties by having a torque adjustment mechanism that allows the counterbalance force provided by the torsion spring to be adjusted to fit a wide range of garage door weights and applications. As example, there could be three ranges of torsion springs which would cover the counterbalance weight of typical overhead doors. For demonstration purposes, the range 1 torsion spring could apply to door weights of 90 thru 130 pounds which would equate to 25.79 in-lbs. torque to 37.26 in-lbs. per revolution of pre-tensioning torque. The range 2 torsion spring could be designed for door weights of 130 thru 180 pounds which would equate to 37.26 in.-lbs. torque to 51.59 in.-lbs. per revolution of pre-tensioning torque. The range 3 torsion spring could be designed for door weights of 180 thru 245 pounds which would equate to 51.59 in.-lbs. per revolution of pre-tensioning torque to 70.21 in.-lbs. of torque. In each of these ranges, the torsion spring can be adjusted, by using the concept of the present invention, to provide the desired counterbalance force for all of the garage doors in the range. These are just examples and there could be more or less ranges of torsion springs but every ranges would cover a varying range of weight and torque values. This allows the manufacturer and dealer to only stock a few torsion springs as the performance of the springs can be adjusted to cover many applications. In addition, a tamper proof clamping mechanism may be incorporated to prevent accidental release of stored spring energy.

SUMMARY OF THE INVENTION

A torque adjustment mechanism is provided for use with a torsion spring. The torsion spring is a coil spring having a plurality of helical coils that define a hollow core. A torque adjuster is positioned in the interior of the hollow core of the coil spring. The torque adjuster has a circular collar on one end and a securing flange on the other end. The circular collar is designed to fit into the hollow core of the coil spring. A clamp is positioned over the exterior of the coil spring in alignment with the circular collar. The clamp secures the coil spring to circular. The position of the collar in the spring defines the number of the coils that are active and establishes the level torque provided by the torsion spring.

DETAILED DESCRIPTION OF THE INVENTION

The invention is directed to a torque adjustment mechanism for a torsion spring. The torsion spring is a coil spring having a plurality of helical coils. The torsion spring is frequently used in connection with garage doors to provide assistance in opening and closing the garage door. Although other uses can be made of the mechanism, the features of the invention will be described in connection with a garage door application. The features of the invention will be more readily understood by referring to the attached drawings in combination with the following.

Figure 1:
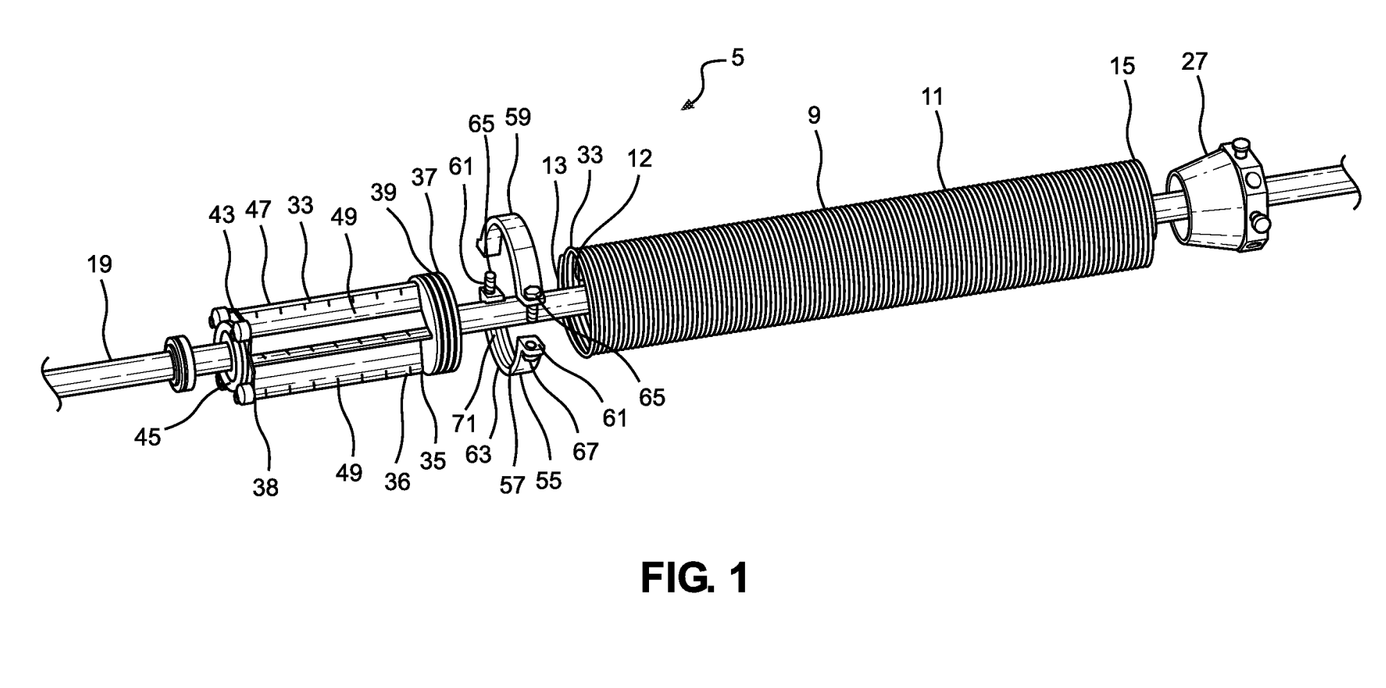
FIG. 1 is a side perspective view of the invention.
Figure 2:
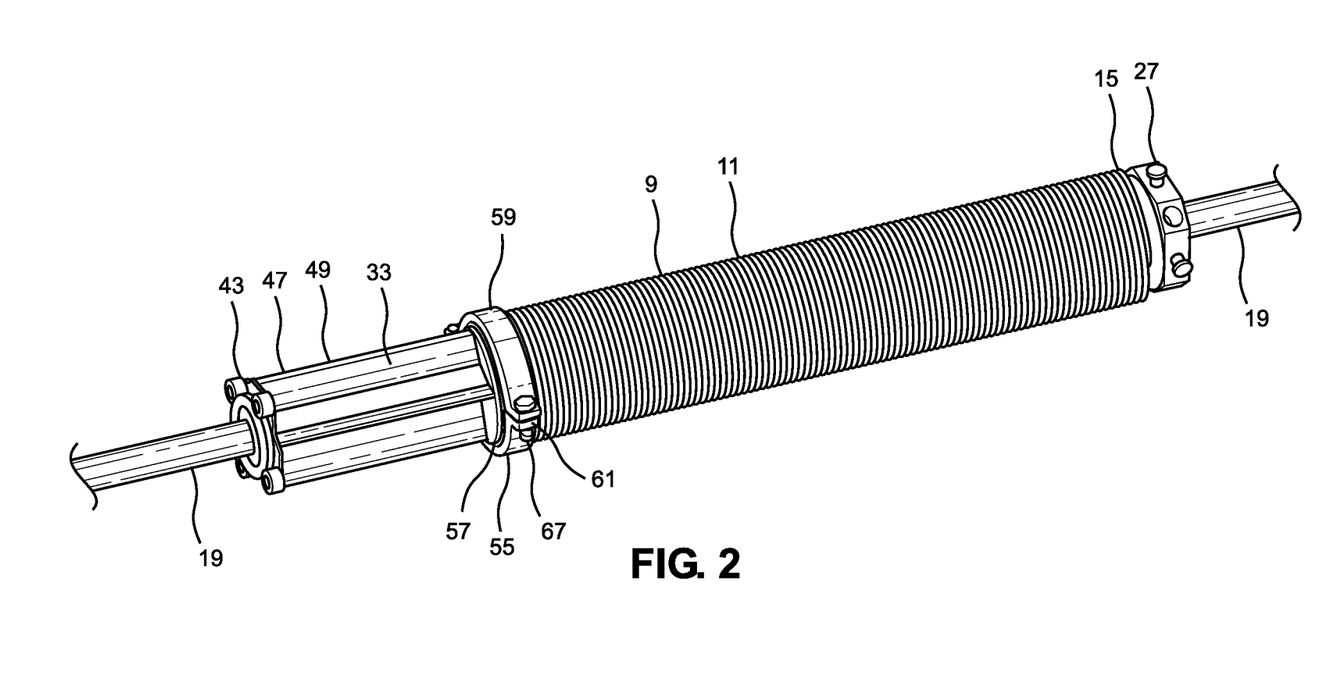
FIG. 2 is a side perspective view.
Figure 3:
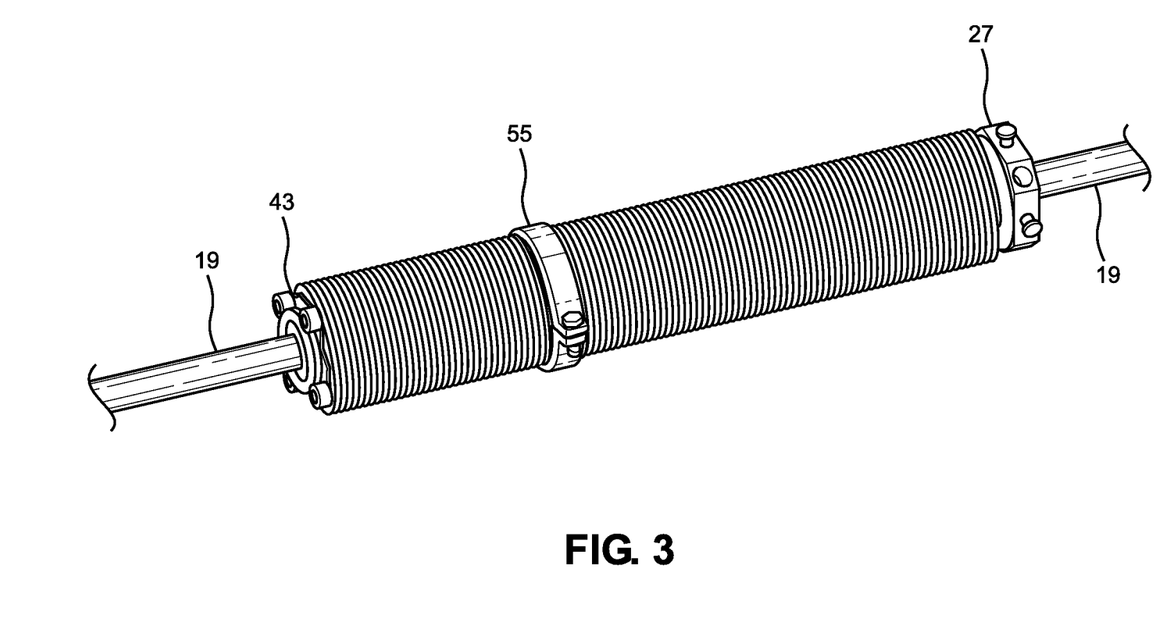
FIG. 3 is a side perspective view.
Figure 4:
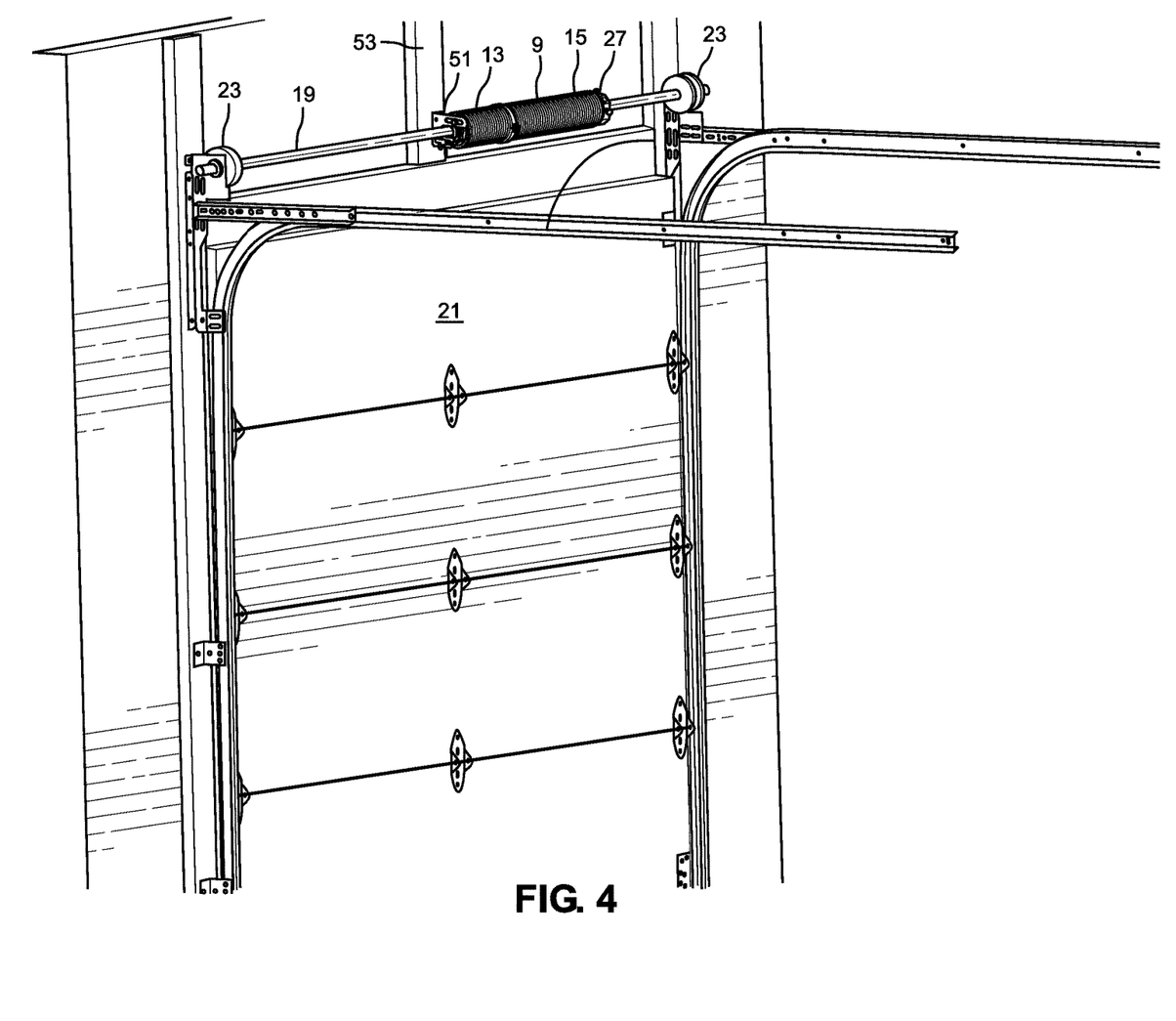
FIG. 4 is a perspective view of the invention used on a garage door.
Figure 5:
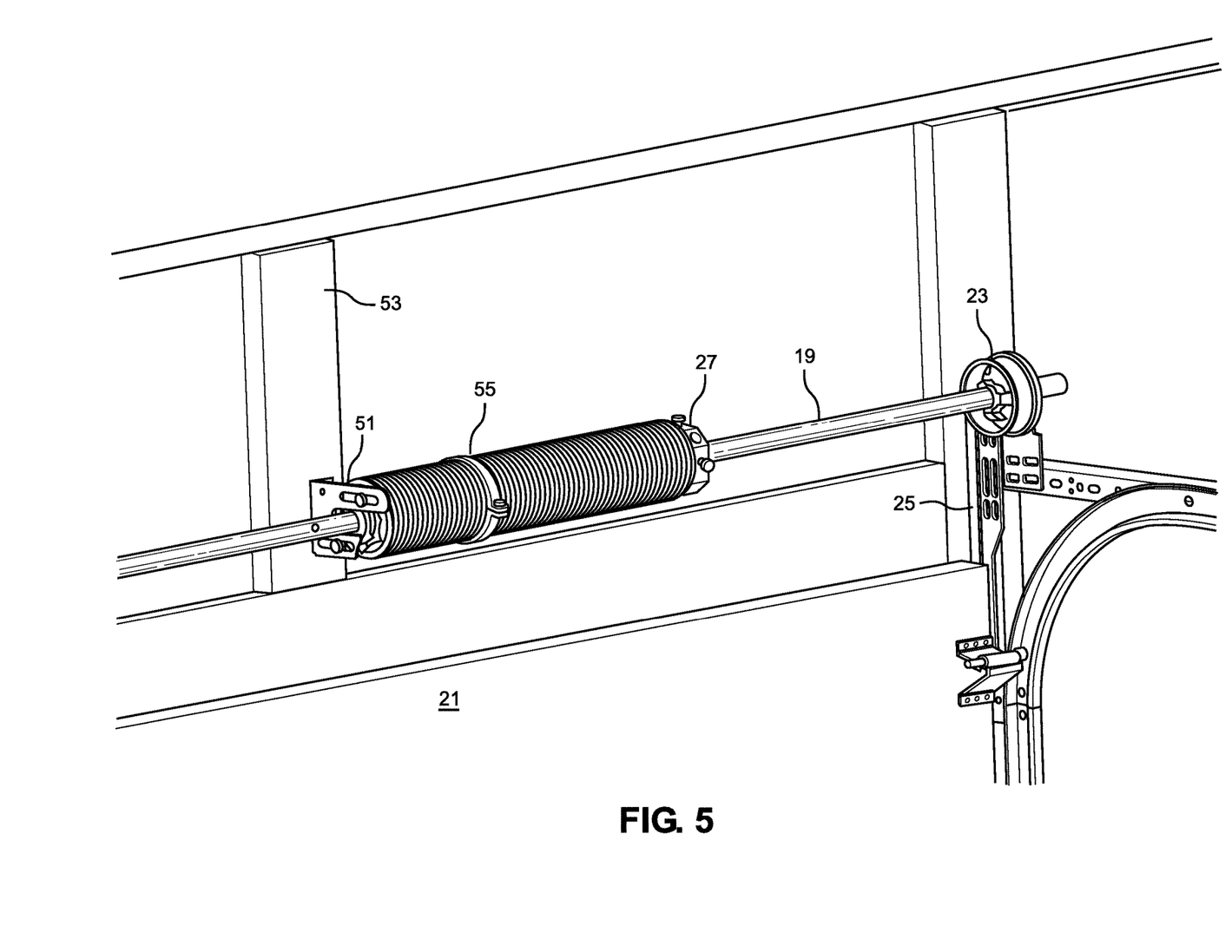
FIG. 5 is a partial prospective view of the invention used on a garage door.
Figure 6:
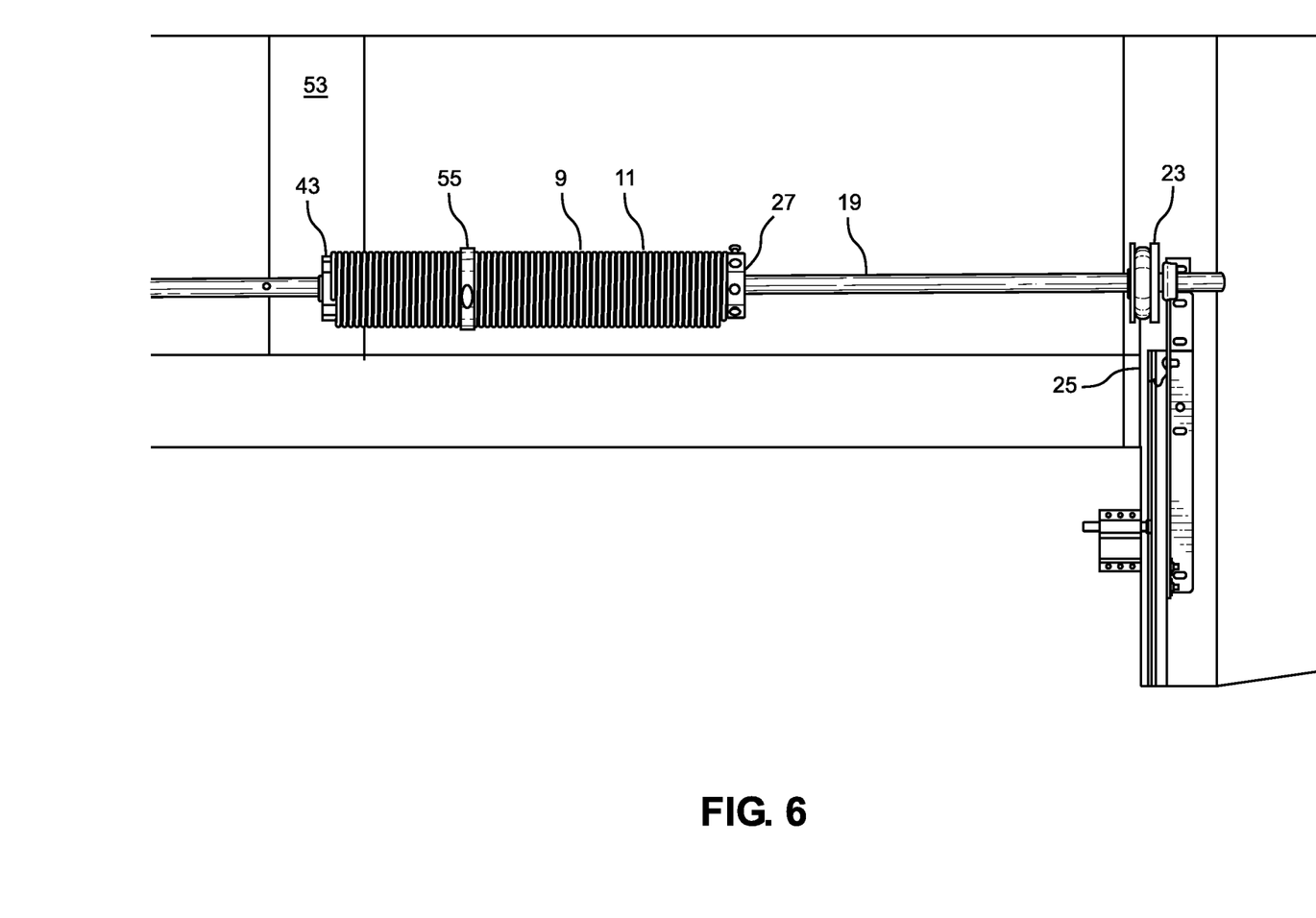
FIG. 6 is a front view of the invention used on a garage door.

As shown in FIGS. 1-6, the mechanism 5 of the invention is utilized with a cylindrical torsion spring 9 which has a plurality of helical coils 11 and a hollow interior 12 defined by the helical coils. The torsion spring has a first end 13 and a second end 15. The torsion spring is positioned around an elongated bar 19 that is positioned adjacent to the top of the garage door 21. A lifting pulley 23 is operatively connected to each end of the elongated bar. Lifting cables 25 extend from the garage door 21 to the lifting pulley positioned on each end of the elongated bar. A winding cone 27 is positioned on the elongated bar 19 and is operatively connected to the second end 15 of the torsion spring 9. The elongated bar, lifting pulleys, lifting cables and winding cone all function in a manner well-known in the garage door art in the features of these components will not be described in detail.

A torque adjustment mechanism 33 is positioned in the interior 12 of the first end 13 of the torsion spring 9. A circular collar 35 is positioned on the end 36 of the torque adjustment mechanism that extends into the interior of the torsion spring 9. The circular collar has an outer perimeter 37 that contain a plurality of grooves 39. The outer perimeter of the circular collar is designed to be in close proximity to the helical coils 11 that form the torsion spring 9. The plurality of grooves 39 on the circular collar are designed to engage the helical coils on the torsion spring. The other end 38 of the torque adjustment mechanism 33 has a securing flange 43 that is designed to be secured to a bracket 51 that is secured to a wall 53 adjacent the garage door 21. A cylindrical passageway 45 extends between the circular collar 35 and the securing flange 43. The elongated bar is positioned in a cylindrical passageway and allows the elongated bar 19 to pass through the torque adjustment mechanism 33. At least one reinforcing rib 47 is positioned on the exterior of the cylindrical passageway 45 and extends between the circular collar 35 in the securing flange 43. In practice, it has been found preferable to have a plurality of reinforcing ribs positioned on the passageway 45. A plurality of spaced markers 49 are positioned on the reinforcing ribs 47. The spaced markers are designed to measure or indicate the location of the circular collar 35 in the interior of the torsion spring 9.

A circular clamp 55 is positioned on the exterior of the torsion spring 9 in alignment with the circular collar 35 on the torque adjustment mechanism 33. The circular clamp has a semicircular first piece 57 and a semicircular second piece 59. Flanges 61 are positioned on the ends of the first and second semicircular pieces and a hole 63 is positioned in each of the flanges 61. The holes 63 are designed to receive a securing device such as a bolt 65 and a nut 67 that can be used to secure the circular clamp 55 to helical coils 11 of the torsion spring 9. The portion of the first and second pieces of the clamp 5 that face the helical coils 11 can contain grooves 71 that are disposed to engage the helical coils of the torsion spring 9. The groves 71 have the same basic configuration as the plurality of grooves 39 on the circular collar 35. The circular clamp functions to secure the torsion spring to the circular collar of the torque adjustment mechanism 33. The spaced markers 49 on the reinforcing ribs 47 can be used to define the desired position of the circular collar 35 in the interior of the torsion spring 9. The location of the circular collar relative to the torsion spring defines the operative length of the torsion spring and the torsional lifting assistance provided by the torsion spring.

The torsion spring 9 is subjected to a shot peening process to increase the strength and longevity of the coil spring. The shot peening process is a well-known process that repetitively contacts/impacts the surface of the material, with hardened shot material, to increase the strength of the material by inducing a compressive force. The shot material also removes surface imperfections and reduces stress raisers in the surface of the material which can extend the cycle life of the spring. The shot peening of the helical coils 11 of the torsion spring 9 can be varied along the length of the torsion spring. The level of shot peening is highest at the second end 15 of the torsion spring and the lowest at the first end 13 of the torsion spring. The level of shot peening can vary in a continuous decreasing manner when moving from the second end of the torsion spring to the first end of the torsion spring. The more shot peening that is applied to the spring, the more the strength and longevity of the spring is increased. Accordingly, the strength and cycle life of the torsion spring decreases when moving from the second end to the first end. The variable level of shot peening is used to optimize the cycle life of the spring in relation to the torque setting required for the specific application or use of the spring. The utilization of variable shot peening allows the spring to be manufactured to achieve the industry standard of a 10,000 minimum cycle life over the entire adjustment range of the spring. The variable shot peening also results in a spring that is not over designed with excessive cycle life at the lower range of torque settings which produces a more acceptable spring for the marketplace. The torsion spring can also be powder coated which will improve the longevity of the torsion spring.

In operation the winding cone 27, torsion spring 9 and torque adjustment mechanism 33 are positioned on the elongated bar 19 as part of the mechanism that is used to lift the garage door 21. The winding cone has a plurality of indentations or threads 29 that interact with the coils 11 of the torsion spring to properly position the winding cone in the interior of the torsion spring. The elongated bar 19 extends through the center of the winding cone, the interior of the torsion spring 9 and the cylindrical passageway 45 in the torque adjustment mechanism 33. The securing flange 43 of the torque adjusting mechanism is secured to a lifting pulley 23 that is operatively connected to the garage door 21 by a lifting cable 25.

The lifting torque that is to be provided by the torsion spring 9, to assist in lifting the garage door 21, is calculated and this determines the number of coils that must be actively engaged to provide the desired lifting torque assistance for lifting the garage door. The torsion spring 9 is advanced over the circular collar 35, on the torque adjustment mechanism 33, until the desired number of helical coils 11 are positioned between the circular collar 35 and the second end of the torsion spring 9. The circular clamp 55 is then positioned over the exterior of the torsion spring 9 immediately above the circular collar 35 on the torque adjustment mechanism 33. The circular clamp is secured to the torsion spring by the bolts 65 and nuts 67 that passed through the holes 63 in the flanges 61 in the first and second pieces of the circular clamp. The circular clamp engages the exterior of the torsion spring 9 with enough force to secure the torsion spring to the circular collar 35. The plurality of grooves 39, 71 on the circular collar and the circular clamp can assist in holding the torsion spring in the desired location on the circular collar. The number of helical coils 11 between the circular collar 35 and the second end of the torsion spring 9 are the active coils that will provide a lifting assistance for the garage door 21. The helical coils 11 that extend from the circular collar 35 in a direction over the reinforcing ribs 47 towards the securing flange 43 are inactive and do not provide lifting torque assistance for the garage door. The spaced markers 49 on the reinforcing ribs 47 can be used to assist in positioning the torsion spring 9 in the proper orientation with respect to the circular collar 35. The markers on each reinforcing rib can be designed to provide positioning assistance for an individual size or lifting capacity of springs. This allows the torque adjustment mechanism to easily adapt to the performance requirements for different springs and the lifting torque requirements needed to provide the desired levels of lifting assistance. If there are three ranges of lifting springs that are required for most garage doors applications, as discussed in the Background of the Invention section, markings could be provided on one of the reinforcing ribs for each of these three springs. This allows the adjustment mechanism to accommodate the springs for various applications. Once the torsion spring 9 is positioned in desired location with respect to the circular collar 35 and secured in place by the circular clamp 55, the winding cone 27 is moved to engage the second end of the torsion spring. The winding cone 27 is rotated around the elongated bar 19 to tension the torsion spring in a manner that is well known in the art. In most applications, from about 6 to about 10 rotations of the winding cone are used to provide the described level of biasing torque for the torsion spring. When the proper number of rotations have been made for the winding cone 27 to achieve the desired level of biasing torque in the torsion spring, the winding cone is secured to the elongated bar 19 in a manner well-known in the art. The helical coils 11 of the torsion spring positioned between the circular collar 35 in the winding cone 27 are the active helical coils that provide the desired lifting torque for the garage door 21. The position of the torsion spring relative to the circular collar allows for various levels of lifting torque to be provided by one torsion spring. Accordingly, a single torsion spring can be utilized to provide lifting assistance for a wide range of different garage doors, and this greatly reduces the number of torsion springs that must be kept in inventory when installing and servicing various garage doors.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A torque adjustment mechanism for a spring comprising:
   a torsion spring having a first end and a second end, and a plurality of helical coils, the helical coils defining a hollow core;
   an elongated bar positioned in the hollow core;
   a winding cone operatively connected to the first end of the torsion spring and releasably secured to the elongated bar;
   a torque adjuster having a circular collar on one end and a securing flange on the other end, a cylindrical passageway extending between the circular collar and the securing flange, the elongated bar positioned in the cylindrical passageway, the circular collar of the torque adjuster being designed to fit into the hollow core of the coil spring;
   a clamp designed to be positioned over the exterior of the torsion spring in alignment with the circular collar, the clamp securing the torsion spring to the circular collar, the position of the circular collar in the torsion spring defining the number of helical coils that are active and establishes the level of torque provided by the torsion spring.

2. The mechanism of claim 1 wherein the circular collar has at least one groove that is designed to engage at least one helical coil on the torsion spring.

3. The mechanism of claim 2 wherein the circular collar has a plurality of grooves and each of the plurality of grooves is disposed to engage a helical coil on the torsion spring.

4. The mechanism of claim 3 wherein the clamp has a plurality of grooves and each of the plurality of grooves is disposed to engage a helical coil on the torsion spring.

5. The mechanism of claim 2 wherein the clamp has at least one groove that is disposed to engage at least one helical oil on the torsion spring.

6. The mechanism of claim 1 wherein the clamp has a circular configuration that is designed to engage an outer surface of the helical coils.

7. The mechanism of claim 1 where the circular collar and the securing flange are spaced apart and at least one spacing rib extends between the circular collar and the securing flange.

8. The mechanism of claim 7 wherein a plurality of spacing ribs are positioned between the circular collar and the securing flange.

9. The mechanism of claim 7 wherein a plurality of spaced markers are positioned on the at least one spacing rib, the space markers providing indication of the position on the torsion spring relative to the at least one spacing rib to achieve a desired level of force from the torsion spring.

10. The mechanism of claim 1 wherein the torsion spring is shot peened to improve the strength and cycle life of the torsion spring, the shot peened level varies along the length of the torsion spring to achieve optimal cycle life throughout the adjustment range for the torsion spring.

11. The mechanism of claim 10 wherein only portions of the torsion spring under high torque load receive the maximum amount of shot peening.

12. The mechanism of claim 11 wherein the shot peened level uniformly decreases from an end of the torsion spring that is spaced apart from the securing flange to an end of the torsion spring that is closer to the securing flange.

13. The mechanism of claim 10 wherein the level of shot peened is greater on the portion of the torsion spring that is spaced apart from the securing flange and less on the portion of the torsion spring that is closer to the securing flange.

* * * * *